3,173,931
21-SUBSTITUTED 3-KETO-Δ⁴-PREGNENES
Edward W. Cantrall, Pearl River, N.Y., Ruddy Littell, Rivervale, N.J., and Seymour Bernstein, New City, N.Y., assignors to American Cyanamid Company, Stamford, Conn., a corporation of Maine
No Drawing. Filed Oct. 31, 1962, Ser. No. 234,555
6 Claims. (Cl. 260—397.45)

This invention relates to new steroid compounds. More particularly, it relates to 21-substituted 3-keto-Δ⁴-pregnenes and method of preparing the same.

The novel steroids of the present invention may be illustrated by the following structural formula:

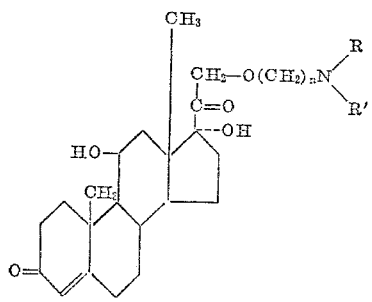

wherein R and R′ are lower alkyl radicals, n is an integer from 2 to 4; and mineral acid salts thereof. The mineral acid salts may be hydrochlorides, hydrobromides, sulfates and the like.

The above free steroids are, in general, crystalline solids relatively insoluble in water but soluble in organic solvents such as lower alkyl alcohols, acetone, ethyl acetate, benzene, toluene, chloroform, ether, petroleum ether and the like. The mineral acid salts are soluble in water.

The present compounds are prepared by heating, for example, 3,20 - bisethylenedioxypregn-5-ene-11β,17α,21-triol with potassium t-butoxide in a solvent and subsequently with a compound of the formula:

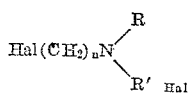

wherein R and R′ are lower alkyl radicals, Hal is halogen and n is an integer from 2 to 4. The reaction mixture is heated to a temperature within the range of 80° to 120° C. for from two hours to 30 hours. The 3,20-bisethylenedioxy alkylated steroid is obtained by evaporation of the solvent and crystallization from a solvent such as aqueous methanol. The 3,20-ethylene ketal groups can be removed by acid hydrolysis with, for example, aqueous sulfuric acid to produce the corresponding 3,20-diketo steroid. These latter steroids can be purified by methods well known in the art.

The compounds of the present invention have been found to have anti-cholesteremic activity. They are therefore useful in lowering abnormally high blood cholesterol often present in certain cardiac conditions.

The following examples describe in detail the preparation of representative 21-substituted 3-keto-Δ⁴-pregnenes.

EXAMPLE 1

Preparation of 3,20-bisethylenedioxy-21-(β-diethylaminoethoxy)-pregn-5-ene-11β,17α-diol A solution containing 10 g. of 3,20-bisethylenedioxypregn - 5 - ene - 11β,17α,21 - triol and 8 g. of potassium t-butoxide in 400 ml. of dry dioxane is heated to reflux for one-half hour. Diethylaminoethyl chloride hydrochloride (6 g.) is added and heating is continued for twenty hours. A second portion of alkylating agent (10 g.) is added. The reaction mixture is refluxed an additional five hours, cooled and filtered. The filtrate is diluted with ethyl acetate, washed with saturated sodium chloride solution, dried and evaporated to give 8 g. of pasty crystals. Crystallization from methanol-water gives 4.8 g., melting point 110–112° C. A sample for analysis is crystallized once from methanol-water and once from acetone-petroleum ether and has melting point 118–120° C., $[\alpha]_D$ —33°.

In the above example when dimethylaminoethyl chloride hydrochloride, 3-diethylaminopropyl chloride hydrochloride and 4-diethylaminobutyl chloride hydrochloride are substituted for diethylaminoethyl chloride hydrochloride, 3,20-bisethylenedioxy-21-(β-dimethylaminoethoxy)-pregn-5-ene-11β,17α-diol; 3,20-bisethylenedioxy-21-(γ-diethylaminopropoxy)-pregn-5-ene-11β,17α-diol and 3,20-bisethylenedioxy - 21 - (δ-diethylaminobutoxy)-pregn-5-ene-11β,17α-diol, respectively, are produced.

EXAMPLE 2

Preparation of 11β,17α-dihydroxy-21-(β-diethylaminoethoxy)-pregn-4-ene-3,20-dione A solution of 1.25 g. of 3,20-bisethylenedioxy-21-(β-diethylaminoethoxy)-pregn-5-ene-11β,17α-diol in 50 ml. of ethanol and 15 ml. of 8% sulfuric acid is heated to reflux for one and one-half hours. The solution is concentrated to about 20 ml., neutralized with 20% sodium hydroxide solution and extracted with ethyl acetate. The extract is washed with water and saturated sodium chloride solution, dried and evaporated. The residue is crystallized from acetone to give 710 mg., melting point 161–162° C., $\lambda_{max}$ 242 mμ (ε 17,200); $[\alpha]_D$ +116°.

When in the above example 3,20-bisethylenedioxy-21-(β - diethylaminoethoxy) - pregn - 5 - ene - 11β,17α - diol is replaced with 3,20 - bisethylenedioxy - 21 - (β-dimethylaminoethoxy) - pregn - 5 - ene - 11β,17α - diol; 3,20-bisethylenedioxy - 21 - (γ-diethylaminopropoxy) - pregn - 5 - ene - 11β,17α - diol and 3,20-bisethylenedioxy-21-(δ-diethylaminobutoxy) - pregn - 5 - ene - 11β,17α - diol the product resulting is respectively 11β,17α-dihydroxy-21-(β-dimethylaminoethoxy) - pregn - 4 - ene - 3,20 - dione; 11β,17α - dihydroxy - 21 - (δ - diethylaminopropoxy)-pregn - 4 - ene - 3,20 - dione and 11β,17α-dihydroxy-21-(δ-diethylaminobutoxy)-pregn-4-ene-3,20-dione.

EXAMPLE 3

Preparation of 11β,17α-dihydroxy-21-(β-diethylaminoethoxy)-pregn-4-ene-3,20-dione hydrochloride A solution of 11β,17α-dihydroxy-21-(β-diethylaminoethoxy)-pregn-4-ene-3,20-dione in diethyl ether is treated with hydrogen chloride to give the product of the example.

We claim:
1. A compound selected from the group consisting of:

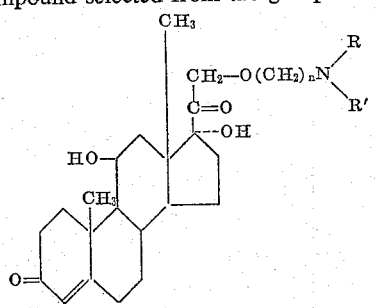

wherein R and R' are lower alkyl radicals, $n$ is an integer from 2 to 4 and its mineral acid salts.

2. The compound 11β,17α - dihydroxy - 21 - (β-diethylaminoethoxy)-pregn-4-ene-3,20-dione.

3. The compound 11β,17α-dihydroxy-21-(β-dimethylaminoethoxy)-pregn-4-ene-3,20-dione.

4. The compound 11β,17α - dihydroxy - 21 - (γ-diethylaminopropoxy)-pregn-4-ene-3,20-dione.

5. The compound 11β,17α - dihydroxy - 21 - (δ-diethylaminobutoxy)-pregn-4-ene-3,20-dione.

6. The compound 11β,17α - dihydroxy - 21 - (β-diethylaminoethoxy)-pregn-4-ene-3,20-dione hydrochloride.

No references cited.